(12) United States Patent
Jain et al.

(10) Patent No.: US 11,821,626 B2
(45) Date of Patent: Nov. 21, 2023

(54) CROSS COMPATIBLE ADAPTER FOR CHIMNEY SECTIONS WITH DIFFERENT OUTER DIAMETERS

(71) Applicant: CARDINAL IP HOLDING, LLC, Glendale, WI (US)

(72) Inventors: Rahul Jain, Rohtak (IN); Satyendra Kumar, Patna (IN); Rajat Saxena, Kentwood, MI (US); Adam Michael Ryczek, Bloomfield, CT (US); Thomas J. Dykhuis, Holland, MI (US)

(73) Assignee: Cardinal IP Holding, LLC, Milwaukee, WI (US)

( * ) Notice: Subject to any disclaimer, the term of this patent is extended or adjusted under 35 U.S.C. 154(b) by 1156 days.

(21) Appl. No.: 16/518,692

(22) Filed: Jul. 22, 2019

(65) Prior Publication Data

US 2020/0370749 A1 Nov. 26, 2020

Related U.S. Application Data

(60) Provisional application No. 62/852,551, filed on May 24, 2019.

(51) Int. Cl.
*F23J 13/04* (2006.01)
*F16L 39/00* (2006.01)
(Continued)

(52) U.S. Cl.
CPC ............... *F23J 13/04* (2013.01); *F16L 21/06* (2013.01); *F16L 37/113* (2013.01);
(Continued)

(58) Field of Classification Search
CPC . F23J 13/04; F23J 13/025; F16L 21/06; F16L 59/06; F16L 9/18; F16L 39/06
(Continued)

(56) References Cited

U.S. PATENT DOCUMENTS 1,281,307 A * 10/1918 Dow et al. ............ F16L 37/252
285/401
1,916,449 A * 7/1933 Tompkins ............. F16L 37/252
285/379

(Continued)

FOREIGN PATENT DOCUMENTS

CA 1197659 A * 12/1985 .............. E04F 17/02
DE 102008055828 A1 5/2010
(Continued)

*Primary Examiner* — Edelmira Bosques
*Assistant Examiner* — Frances F. Hamilton
(74) *Attorney, Agent, or Firm* — Dinsmore & Shohl LLP (57) ABSTRACT

An adapter and adapter system for connecting a female end of a first chimney portion to a male end of a second chimney portion. The adapter includes a first radial adapter portion with a first inner surface and a first outer surface extending along a first axis and wherein the first inner surface and the first outer surface are substantially coaxial. The adapter further includes a first locking interface protruding outward from the first outer surface and configured to engage with a first locking interface of the first chimney portion and a second locking interface protruding inward from the first inner surface and configured to engage with a second interlocking interface of the second chimney. The first outer surface of the adapter is configured to be received within the female end of the first chimney portion and the inner surface is configured to receive the male end of the second chimney.

17 Claims, 6 Drawing Sheets

(51) Int. Cl.
*F16L 21/06* (2006.01)
*F16L 37/113* (2006.01)
*F16L 37/252* (2006.01)
*F23J 13/02* (2006.01)
*F16L 59/06* (2006.01)
*F16L 9/18* (2006.01)
*F16L 39/06* (2006.01)
*F16L 25/14* (2006.01)

(52) U.S. Cl.
CPC .............. *F16L 37/252* (2013.01); *F16L 9/18* (2013.01); *F16L 25/14* (2013.01); *F16L 39/005* (2013.01); *F16L 59/06* (2013.01); *F23J 13/025* (2013.01); *F23J 2213/202* (2013.01)

(58) Field of Classification Search
USPC .......................................................... 454/47
See application file for complete search history.

(56) References Cited

U.S. PATENT DOCUMENTS

| | | | | |
|---|---|---|---|---|
| 2,650,112 A | * | 8/1953 | Kinkead | F23J 13/025 285/422 |
| 3,170,544 A | * | 2/1965 | Kinkead | F16L 59/188 285/305 |
| 3,226,135 A | * | 12/1965 | Epstein | F16L 9/18 138/112 |
| 3,272,537 A | * | 9/1966 | Bellatorre | F23J 13/04 285/424 |
| 3,872,780 A | * | 3/1975 | Zanias | F23J 13/04 126/307 R |
| 4,502,370 A | * | 3/1985 | Baileys | F23J 13/025 126/307 R |
| 4,929,000 A | * | 5/1990 | Annestedt, Sr. | F23J 13/025 138/148 |
| 5,165,732 A | * | 11/1992 | Townsend | F23J 13/04 126/307 R |
| 5,651,732 A | * | 7/1997 | Dufour | F23J 13/04 126/307 R |
| 5,735,082 A | | 4/1998 | Lecuyer | |
| 6,076,862 A | * | 6/2000 | Barth | F16L 39/005 454/47 |
| 6,113,155 A | * | 9/2000 | Beirens | F16L 21/03 285/47 |
| 6,634,352 B2 | * | 10/2003 | Maiello | F23J 13/04 126/307 R |
| 2002/0092518 A1 | * | 7/2002 | Maiello | F23J 13/04 126/318 |
| 2003/0209908 A1 | * | 11/2003 | Vanasse | F16L 23/08 285/407 |
| 2007/0257487 A1 | * | 11/2007 | Jacklich | F16L 37/252 285/402 |
| 2010/0267327 A1 | * | 10/2010 | Jacklich | F23J 13/04 29/700 |
| 2015/0240977 A1 | * | 8/2015 | Zonneveld | F16L 23/032 251/149.6 |
| 2016/0245443 A1 | * | 8/2016 | Zonneveld | F16L 37/18 |
| 2018/0128406 A1 | * | 5/2018 | Kozicz | F16L 37/252 |
| 2020/0378598 A1 | * | 12/2020 | Jain | F23J 13/025 |

FOREIGN PATENT DOCUMENTS

| | | | | |
|---|---|---|---|---|
| DE | 202010002280 U1 | | 10/2010 | |
| EP | 1176354 A2 | * | 1/2002 | ............ F16L 37/252 |
| FR | 2853954 A1 | | 10/2004 | |
| GB | 1350593 A | * | 4/1974 | ............ F16J 15/025 |
| GB | 2440016 A | * | 1/2008 | ............ F16L 25/10 |
| WO | WO-2018041276 A1 | * | 3/2018 | |

* cited by examiner

CROSS COMPATIBLE ADAPTER FOR CHIMNEY SECTIONS WITH DIFFERENT OUTER DIAMETERS

CROSS-REFERENCE TO RELATED APPLICATION

This application claims the benefit of U.S. Provisional Application Ser. No. 62/852,551, entitled "CROSS COMPATIBLE ADAPTER FOR DIFFERENT CHIMNEY DESIGNS" and filed on May 24, 2019, which is expressly incorporated by reference herein in its entirety.

FIELD OF THE INVENTION

The present disclosure relates generally to an apparatus and method for adapting a first chimney portion to a second chimney portion. Specifically, for an adapter that allows a first style of chimney having a first diameter and/or mounting interface to be connected with a second style of chimney having a second diameter and/or mounting interface.

BACKGROUND

Chimneys or flue gas vents are required in many structures to allow for the proper flow of gasses from a chimney or gas vent. Certain types of chimneys have a double wall construction and are required to be able to withstand a specific amount of heat for a specified period of time in order to comply with residential or commercial codes. Chimneys may be assembled in sections and typically have some type of mounting interface that allows each section to be connected to another section. A specific model or brand of chimney may have a specific diameter, exterior dimension, and/or mounting interface which may not be cross-compatible with other specific models or brands of chimneys. The current disclosure seeks to solve the aforementioned deficiencies of the present technology by providing an adapter that allows a first type of chimney that is not normally compatible with a second type of chimney to be properly connected.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In accordance with one aspect of the disclosure an adapter configured to connect a female end of a first chimney portion to a male end of a second chimney portion is disclosed. The adapter may include a first radial adapter portion with a first inner surface and a first outer surface extending along a first axis and wherein the first inner surface and the first outer surface are substantially coaxial. The adapter may further include a first locking interface protruding outward from the first outer surface and configured to engage with a first locking interface of the first chimney portion and a second locking interface protruding inward from the first inner surface and configured to engage with a second interlocking interface of the second chimney portion. The first outer surface may be configured to be received within the female end of the first chimney portion and the inner surface is configured to receive the male end of the second chimney portion.

In accordance with another aspect of the disclosure an adapter system configured to connect a female end of a first chimney portion to a male end of a second chimney portion is disclosed. The adapter system may include an adapter having a first radial adapter portion with a first inner surface and a first outer surface extending along a first axis. The first inner surface and the first outer surface may be substantially coaxial. The adapter may further include a first locking interface protruding outward from the first outer surface and configured to engage with a first locking interface of the first chimney portion and a second locking interface protruding inward from the first inner surface and configured to engage with a second interlocking interface of the second chimney portion. The first outer surface may be configured to be received within the female end of the first chimney portion and the inner surface is configured to receive the male end of the second chimney portion. The adapter system may further include an inner sleeve configured to fit within the adapter, the first chimney portion, and the second chimney portion; and a clamping ring configured to interface with and couple a first chimney portion flange of the first chimney portion and a second chimney portion flange of the second chimney portion.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details. In other instances, well-known methods, procedures, and components have not been described in detail so as to not unnecessarily obscure aspects of the present invention.

For purposes of the disclosure, directional terms are expressed generally with relation to a standard frame of reference when the chimney or gas vent pipe and adapter are installed and in an in-use orientation.

Throughout the disclosure the term substantially may be used as modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of ordinary skill in the art.

Throughout the disclosure the terms flue or gas vent pipe, chimney, or gas flue may be used interchangeably. A flue or gas vent pipe may include any pipe that allows for fluid flow. Some examples may include exhaust pipes for the exhaust of fumes from a fireplace, furnace, heater, boiler, oven, cooktop or other cooking device; a dryer vent; a natural gas, propane stove, or heater vent, to name a few non-limiting examples. The flue or gas vent pipe may be have a circular, oval, square, rectangular, or any enclosed geometric shape. In some examples, chimney, flue, or gas vent pipe may be single walled or double walled.

The present disclosure is related an adapter system configured to join two or more sections of a chimney which may be chimneys from different manufacturers and/or models having different inner and/or outer diameters, dimensions or geometries at the terminal ends of the chimney sections. Likewise, an adapter in accordance with the current disclosure may allow for the proper interface of two or more chimneys or chimney sections that may not normally be cross-compatible. For example, the mounting interfaces of each of the chimney sections may have different connection interfaces and/or may have differing geometry which would result in gaps at the interface of the two or more chimneys. Amongst other advantages, the adapter may allow for a decrease in the brands and/or types of chimneys that must be inventoried and/or improved efficiency when the chimney or chimney sections are installed on site by technicians. The adapter may further provide a leak resistant and high-temperature resistant seal between the two chimneys and/or sections of chimneys, to name a few additional example advantages.

Figure 1:
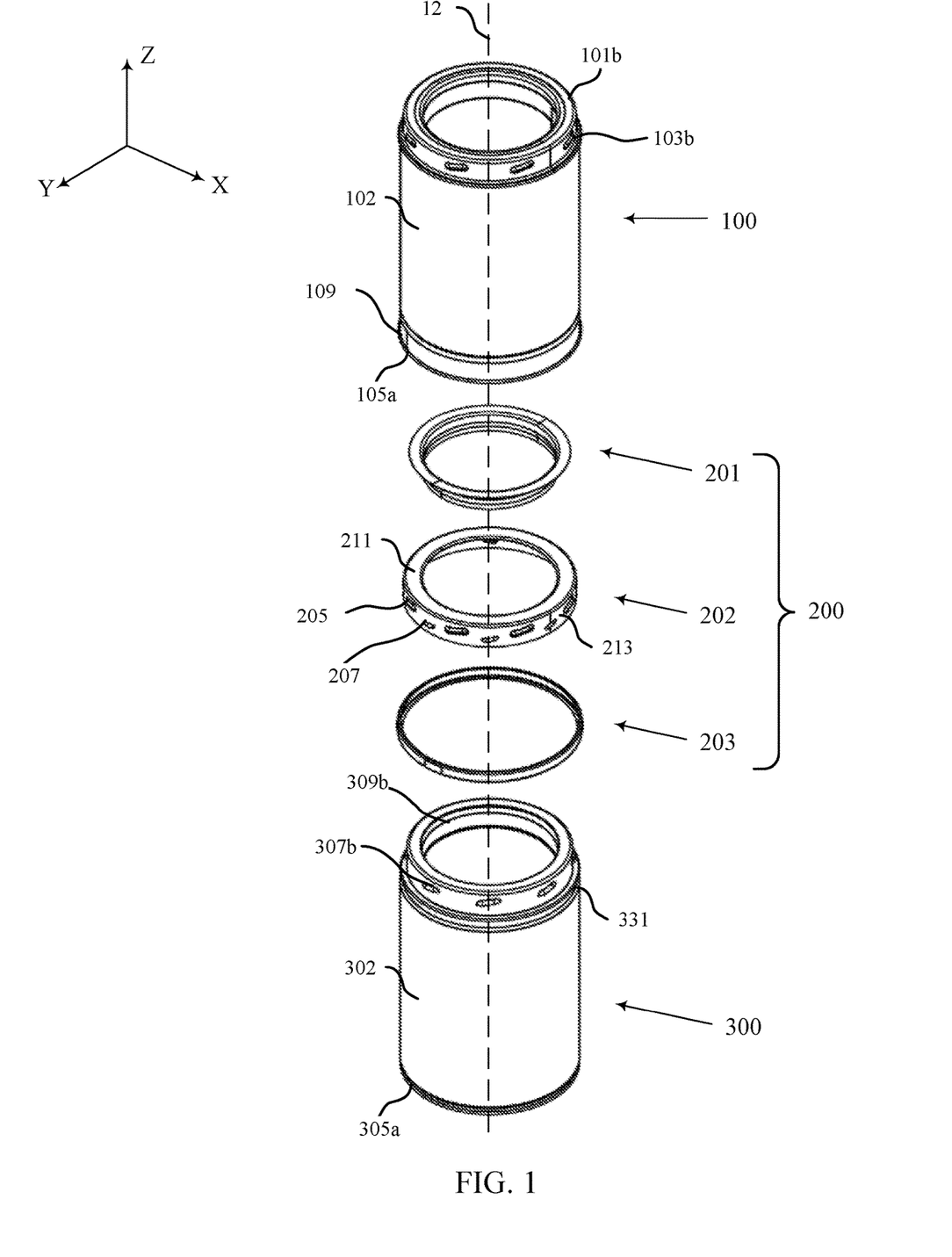
FIG. 1 is an exploded perspective view of an example adapter and sections of a chimney in accordance with one aspect of the disclosure.
Figure 2:
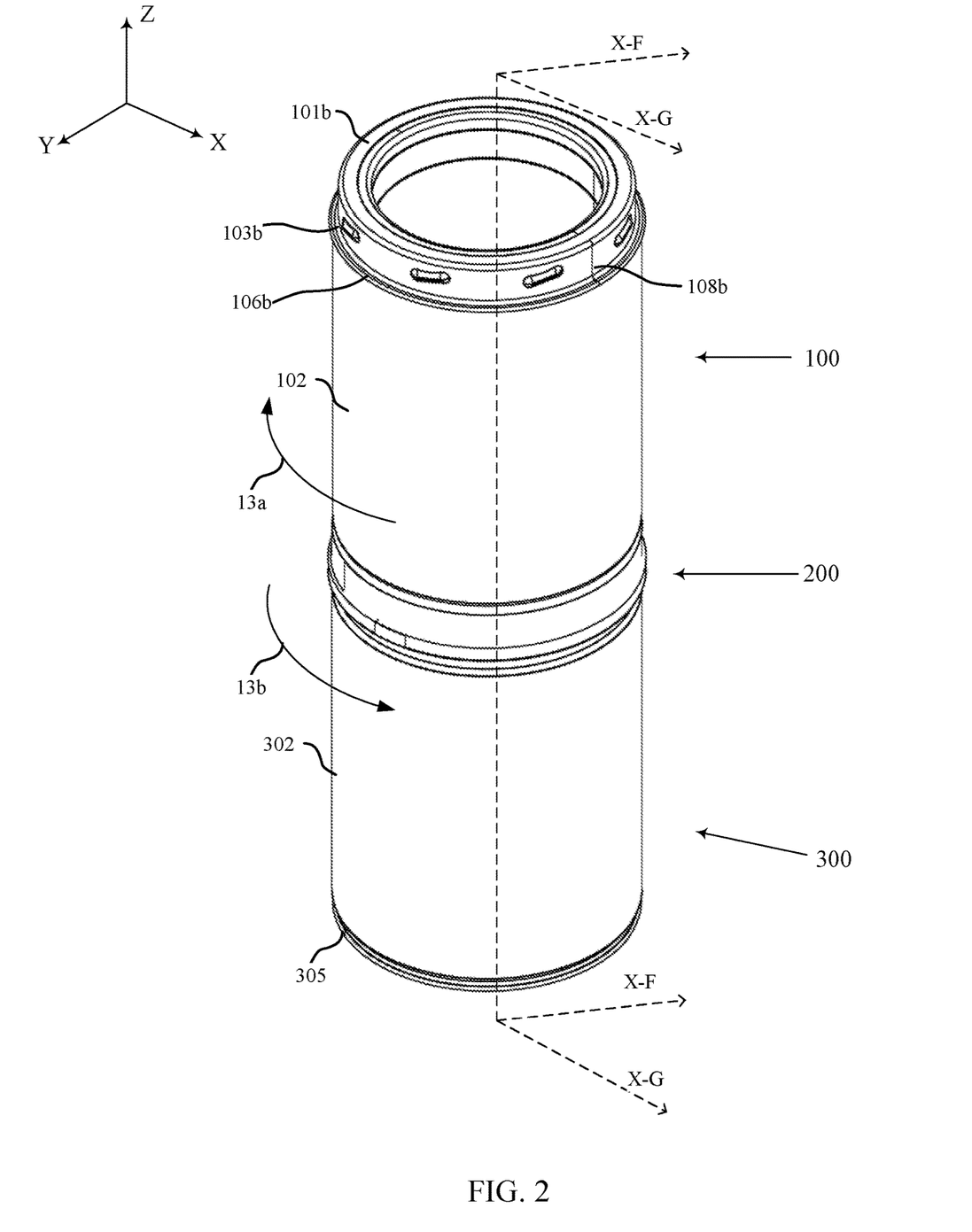
FIG. 2 is an assembled perspective view of the example adapter and sections of the chimney of FIG. 1 in a connected state in accordance with one aspect of the disclosure.

FIGS. 1 and 2 show a respective exploded view and an assembled view of two sections of chimney joined via an example adapter system in accordance with one aspect of the disclosure. The following description of FIGS. 1 and 2 serve as a broad overview of an example adapter and functionality of the example adapter in accordance with the current disclosure. Further details of the features referenced in FIGS. 1 and 2 will be described in further detail below. As shown in FIGS. 1 and 2, the adapter system 200 may be configured to join a first section or portion of first chimney portion 100 with a second section or portion of the second chimney portion 300, which may be connected to form a chimney. In one example, the first portion of chimney may for example be a first brand and/or model of chimney having a first male interface 101*b* and a first female interface 105*a*. In one non-limiting example, the first chimney 100 may be a SuperVent® brand chimney section by Selkirk Corp., of Richardson, Tex. The second chimney portion 300 may for example be a second brand and/or model of chimney having a second male interface 309*b* and a second female interface 305*a*. In one non-limiting example, the second chimney 300 may be an UltraTemp® and/or GalvaTemp® chimney section by Selkirk Corp., of Grand Rapids, Mich. In one example, the first female interface 105*a* may not be directly compatible or capable of being properly joined with the second male interface 309*b* due to differences in the dimensions and/or mounting interface features. The example adapter system 200 described herein may allow the first chimney portion 100 to be connected to the second chimney portion 300 despite the aforementioned differences between the mounting interfaces between the two chimneys. Further, an adapter ring 202 may fit within the female interface 105*a* of the first chimney portion 100 and may be capable of receiving a male interface 309*b* of the second chimney portion 300. The fitment of the adapter within the female interface 105*a* of the first chimney portion 100 may result in a minimal increase in the overall assembly height (e.g., the height of the assembled chimney sections in the Z-direction) of the chimneys 100 and 300 by only a thickness of the adapter or portion of the adapter.

In the examples shown in FIGS. 1-4, the first chimney portion and/or chimney section may be a double walled first chimney portion 100 having a radial outer surface 102 with a first circumference. The first chimney portion 100 may be configured to twist-and-lock with a similar chimney portion or other section of chimney (not shown) via the first chimney portion male interface 101*b*, which may include a series of locking features 103*b* as a series of protrusions that are configured to interact with a series of locking protrusions that may be similar or identical to locking protrusion(s) 129*a* that are described in further detail below. The first chimney portion 100 may further comprise a female interface 105*a* with an outer rim 109, which may be configured to twist-and-lock with another section of chimney or another chimney (not shown) that has a male end similar or identical to the male interface 101*b* of the first chimney portion 100. Thus, when a series of first chimney portions 100 are used to form a chimney, each individual chimney portion can twist-and-lock together with one another to form a single chimney. Further details of the example mounting features of the first chimney portion 100 at the female mounting interface 105*a* will be described in further detail below.

The examples in FIGS. 1-4 also show a second chimney portion 300. The second chimney portion 300, may for example also employ a double walled construction and may have a radial outer surface 302 having a second circumference. The second chimney portion 300 may further include a include the second chimney portion male mounting portion 309b, which may include a series of locking features 307b, which are described in further detail below. The second chimney portion 300 may further comprise a second female mounting portion 305a, which may be configured to twist-and-lock with another section of chimney (not shown) that has a male end similar or identical to the male mounting portion 309b of the second chimney portion 300. Further details of the example mounting features of the second chimney portion 300 will be described in further detail below. As mentioned above, while the first female interface 105a may have an inner dimension large enough to receive the male interface 309b of the second chimney portion 300, the locking features of the first chimney portion 100 and the second chimney portion 300 may not be directly compatible and/or capable of properly interlocking with one another. Further, attempting to directly connect the first female interface 105a of the first chimney portion 100 with the second male interface 309b of the second chimney portion 300 may result in gaps or openings that may not be acceptable for proper function of the chimney and/or to comply with regulations or codes. As described below, the adapter system 200 may allow for a proper coupling of the first chimney portion 100 with the second chimney portion 300 despite any incompatibility between the first female interface 105a and the second male interface 309b.

Figure 5:
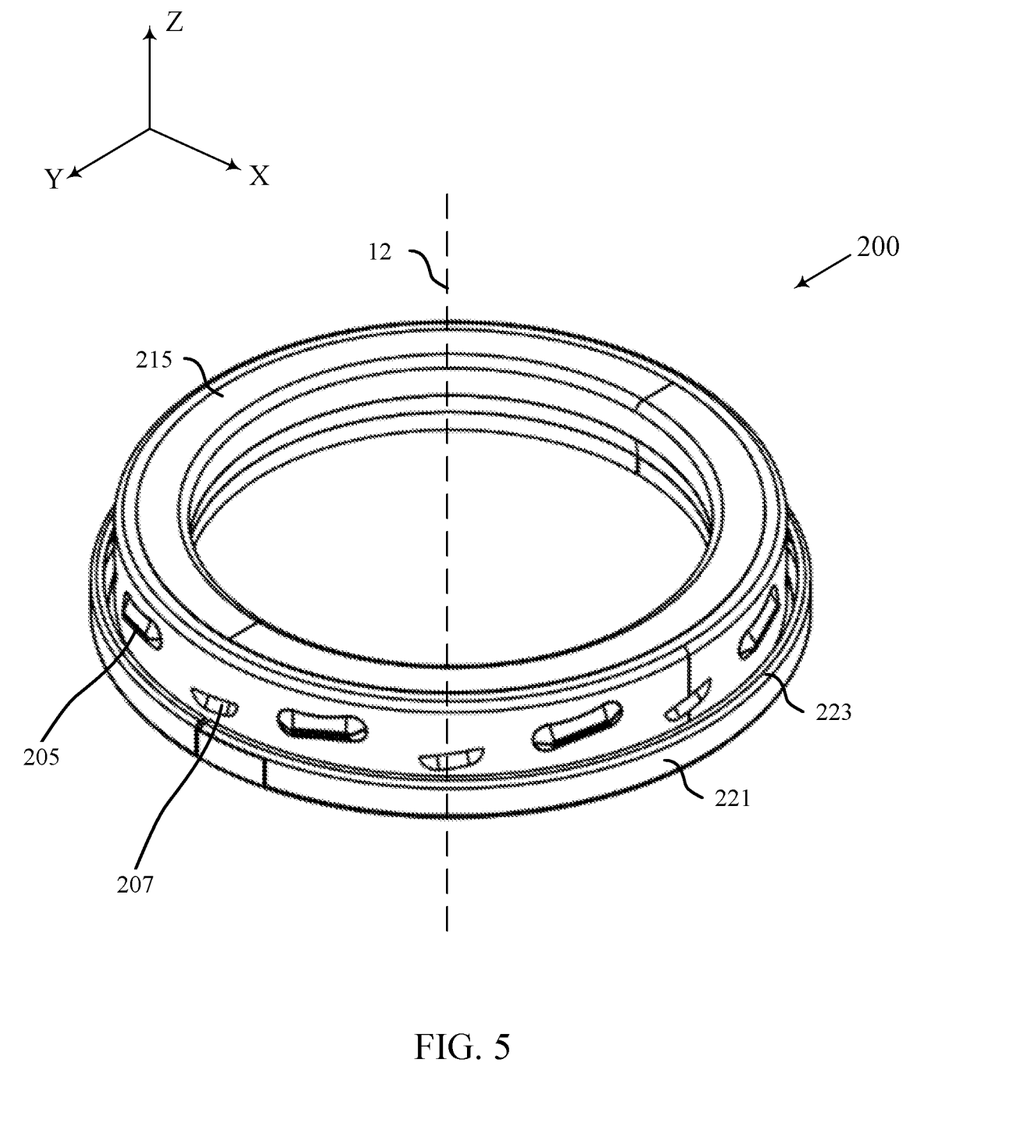
FIG. 5 is a perspective view of the example adapter of FIGS. 1-4 in accordance with one aspect of the disclosure.
Figure 6:
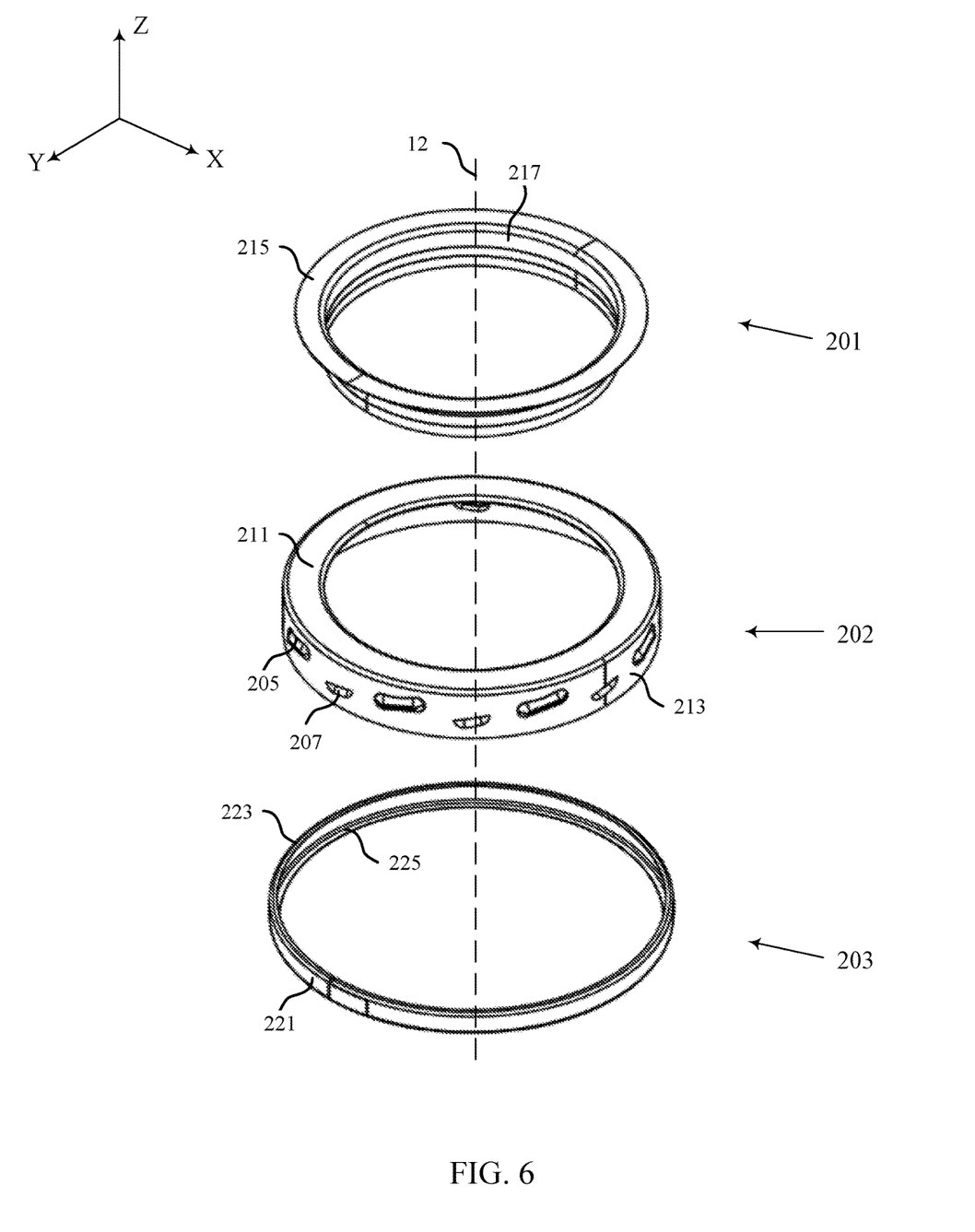
FIG. 6 is an exploded top perspective view of the example adapter of FIGS. 1-5 in accordance with one aspect of the disclosure.

The adapter system 200 may for example include an inner sleeve 201, which may function to prevent buildup of material (e.g., creosote or soot) at the interface between the inner surfaces of the first chimney portion 100 and the second chimney portion 300. The adapter system 200 may further include an adapter ring 202. The adapter ring 202 (which may hereinafter be interchangeably referred to as an adapter) may include a first radial adapter portion 213 consisting of an inner surface and an outer surface that extends along a first axis 12 (FIGS. 1, 5 and 6). The adapter ring 202 may further include a second radial adapter surface 211 that may be connected to and form a surface that is substantially perpendicular to the first adapter portion 213. In addition, the first radial adapter portion 213 may include a series of first locking interfaces 205 (best shown in FIG. 3B). The first locking interfaces 205 may be formed as protrusions that extend outward from the outer surface of the first radial adapter portion 213. Further, the first radial adapter portion 213 may include a series of second locking interfaces 207 (best shown in FIG. 4B). The second locking interfaces 207 may for example be formed as protrusions that extend outward (in an inwards direction) from the inner surface of the first radial adapter portion 213. In one example, the second locking interfaces 207 may each include an opening or cut. It is noted that while only a single locking interface of both the first locking interface 205 and the second locking interface 207 are labeled in FIGS. 1-6 for simplicity purposes, the adapter ring 202 may include a plurality of each of the aforementioned interfaces as shown in FIGS. 1, 5, and 6. For example, the adapter ring 202 may include eight of the first locking interfaces 205. In the aforementioned example, the eight first locking interfaces 205 may be evenly spaced around the circumference of the first radial adapter portion 213. Further, the adapter ring may include eight of the second interfaces 207, for example. The aforementioned eight second interfaces 207 may be evenly spaced around the circumference of the first radial adapter portion 213.

Figures 3A, 3B:
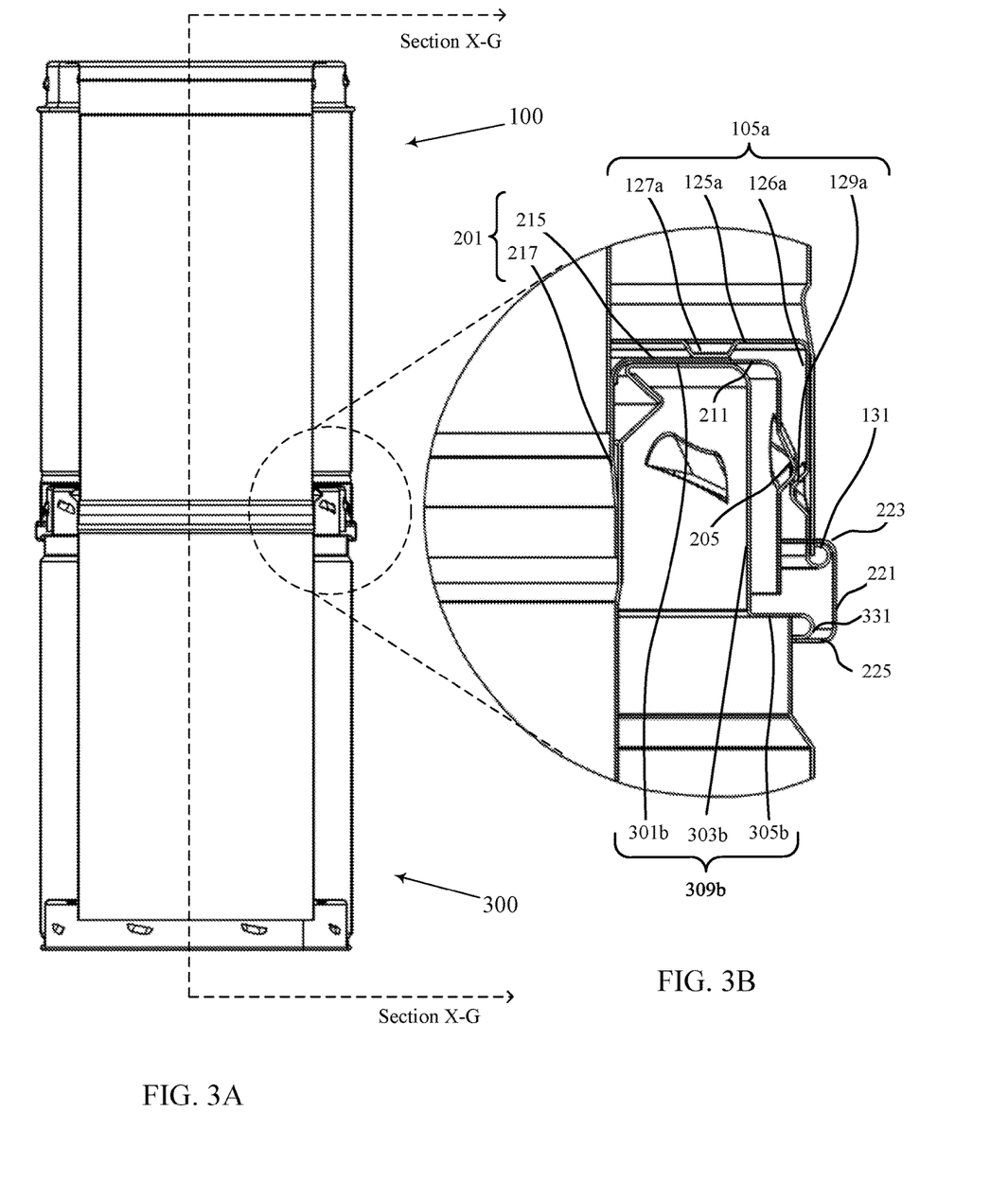
FIG. 3A is a cross-sectional view of the assembled example adapter and sections of the chimney of FIGS. 1 and 2 along section X-G in accordance with one aspect of the disclosure.
FIG. 3B is a close-up cross-sectional view of the assembled example adapter and sections of the chimney of FIG. 3A in accordance with one aspect of the disclosure.
Figures 4A, 4B:
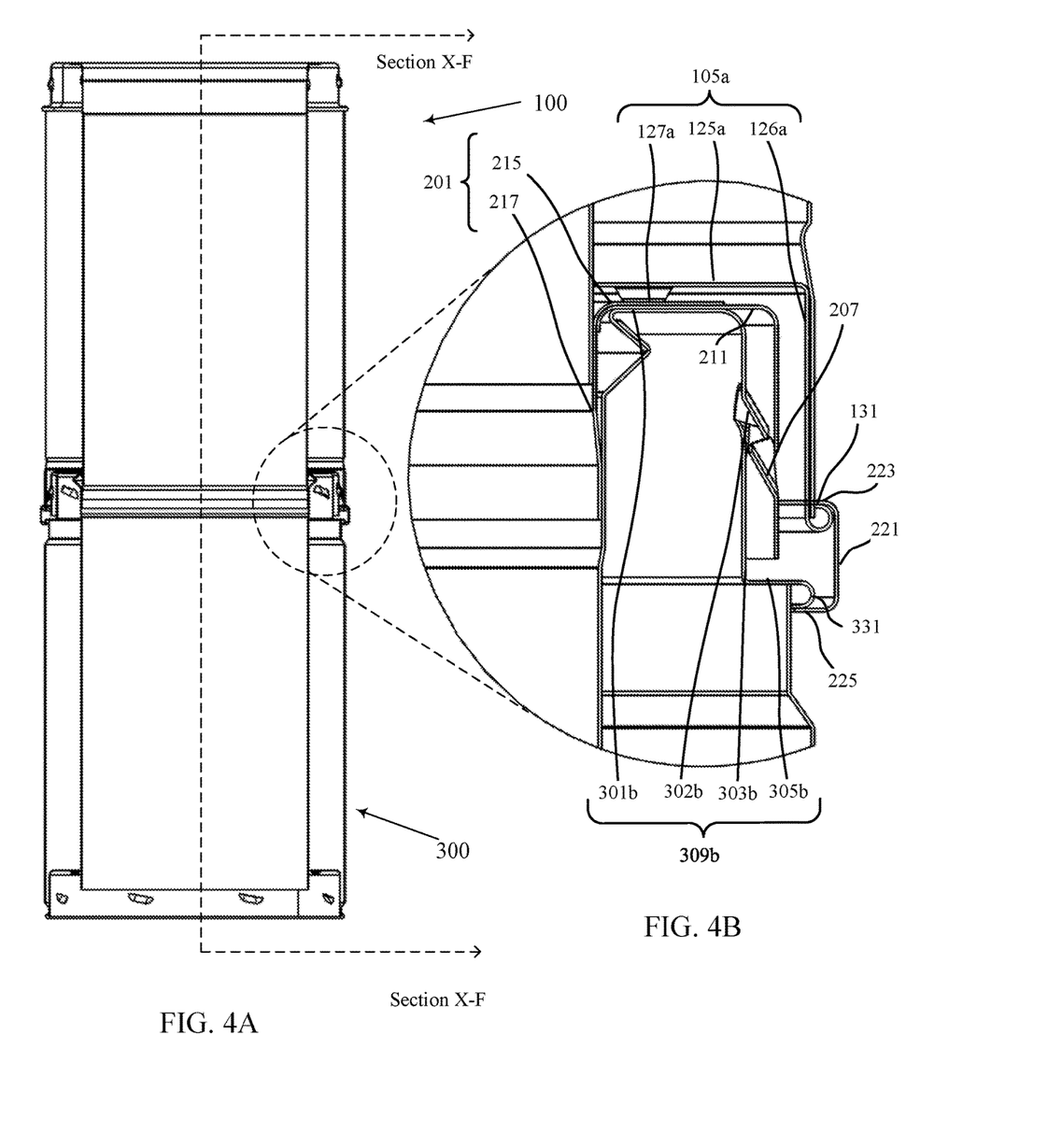
FIG. 4A is a cross-sectional view of the assembled example adapter and sections of chimney of FIGS. 1-3 along section X-F in accordance with one aspect of the disclosure.
FIG. 4B is a close-up cross-sectional view of the assembled example adapter and sections of the chimney of FIG. 4A in accordance with one aspect of the disclosure.

FIGS. 3B and 4B show a detailed close-up cross-section view about section X-G and X-F (FIG. 2) of the interface between the adapter system 200 and the first chimney portion 100 and second chimney portion 300. As shown in FIG. 3B, the adapter ring 202 may be configured to fit within the first female interface 105a of the first chimney portion 100. In one example, the first female interface 105a of the first chimney portion 100 may include a horizontal radial inner surface 125a, a vertical radial inner surface 126a, and a spacing protrusion 127a. It is noted that while only a single spacing protrusion 127a is shown in FIG. 3B and 4B, a plurality of spacing protrusions may be provided at the first female interface 105a of the first chimney portion 100 to decrease heat transfer between the sections of chimney. The first female interface 105a of the first chimney portion 100 may further include a first chimney locking protrusion 129a. It is noted that while only one first chimney locking protrusion is shown in FIG. 3B, the vertical radial inner surface 126a of the first chimney portion 100 may include a plurality of first chimney locking protrusions similar or identical to the first chimney locking protrusion 129a. In one example, the female interface 105a of the first chimney portion 100 may include a series of eight first chimney locking protrusions 129a, which may be evenly spaced or substantially evenly spaced along the inner circumference of the vertical radial surface 126a. Each one of the first chimney locking protrusions 129a may be formed as an elongated protrusion which may curve and/or be angled with relation to the vertical radial inner surface 126a. In one example, the aforementioned curve and/or angle of the first chimney locking protrusion 129a may allow the first chimney portion 100 to twist-and-lock or rotate-and-lock to the adapter 202 via engagement with the first locking interface or interfaces 205 of the adapter ring 202.

Turning to FIG. 4B, the adapter 202 may be configured to receive a second male interface 309b of the second chimney portion 300. In one example, the second male interface 309b of the second chimney portion 300 may include a horizontal radial surface 301b, a vertical radial surface 303b, and a flange 305b. The second male interface 309b of the second chimney portion 300 may further include a second chimney portion locking protrusion 302b. In one example, the second chimney locking protrusion 302b may include a cut or opening as shown in FIG. 4B. In another example, the second chimney locking protrusion(s) may be indents. It is noted that while only one second chimney locking protrusion 302b is shown in FIG. 4B, the vertical radial surface 303b of the second chimney portion 300 may include a plurality of second chimney locking protrusions similar or identical to locking protrusion 302b. In one example, the second male interface 309b of the second chimney portion may include a series of eight second chimney locking protrusions 302b which may be evenly spaced or substantially evenly spaced along the inner circumference of the vertical radial surface 303b. Each one of the second chimney locking protrusions 302b may be formed as an elongated protrusion with a cut or opening having a border which may curve and/or be angled with relation to the vertical radial surface 303b. In one example, the aforementioned curved boarder of the cut or opening and/or angle of the second chimney locking protrusion 302b may allow the second chimney portion 300 to twist-and-lock or rotate-and-lock to the adapter ring 202 via engagement between the second chimney locking protrusion(s) 302b and the second locking interface(s) 207 of the adapter ring 202.

The adapter system 200 may further include a clamping ring 203. The clamping ring 203 may include a curved surface with a first flange 223 and a second flange 225 which may be configured to interface with and connect a subsequent outer rim 131 of the first chimney portion 100 and an outer rim 331 of the second chimney portion 300 once the adapter ring 202 and inner sleeve 201 is installed as described below. In one example, the clamping ring 203 may have a split and a tightening portion (not shown), the tightening portion may include any known method including a tightening apparatus used in a hose clamp for example, and/or a screw or bolt to name a few non-limiting examples.

The adapter system 200 may further include an inner sleeve 201. The inner sleeve may include a first portion 215 configured to mate with the second radial adapter surface 211 of the adapter ring 202. The inner sleeve 201 may further include an inner portion 217 that forms a radial surface that extends along first axis 12. As best shown in FIGS. 3B and 4B, the inner portion 217 of the inner sleeve 201 may block or seal off a gap that is between the first chimney portion 100 and the second chimney portion 300 once the adapter is installed to connect the two chimney portions to form a single chimney. The adapter may prevent the buildup of creosote and/or soot at the interface between the first chimney portion 100 and the second chimney portion 300.

It is noted that while the adapter and/or adapter system 200 shown in FIGS. 1-6 are shown as separate components, in one example the adapter ring 202 and the inner sleeve 201 may be joined permanently to form a single component. The inner sleeve 201 and the adapter ring 202 may be formed as a single component or may be joined using any suitable method. For example, the adapter ring 202 and inner sleeve may be welded or fastened together using glue or fasteners such as rivets, screws and/or bolts to name a few examples.

In one example use of the adapter system 200, the inner sleeve 201 may already be connected to the adapter ring 202 via an adhesive, welding, or using any of the fastening methods given as examples throughout the disclosure or as known in the art. In another example, the adapter 202 and the inner sleeve 201 may be separate components and the inner sleeve may be placed within the opening in the adapter 202 or otherwise connected to the adapter 202. The adapter 202 and the inner sleeve may be placed onto the second male interface 309b of the second chimney portion 300 as shown in the cross-sectional views in FIGS. 3A-4B, so that the second radial adapter surface 211 of the adapter 202 contacts the horizontal radial surface 301b of the second male interface 309b. Once the adapter 202 and the inner sleeve 201 are placed onto the second male interface 309b of the second chimney portion 300, the first female interface 105a of the first chimney portion 100 may be aligned with and placed onto the second male interface 309b of the second chimney portion 300 as shown in the cross-sectional views in FIGS. 3A-4B. Once the adapter 202 and the inner sleeve 201 are within the first female interface 105a of the first chimney portion and the first portion 215 of the inner sleeve 201 contacts the spacing protrusions 127a of the first female interface, the first chimney portion 100 may be rotated in first direction 13a and/or the second chimney portion 300 may be rotated in second direction 13b causing engagement between the second chimney locking protrusion(s) 302b and the second locking interface(s) 207 of the adapter ring 202. Further, the aforementioned relative rotation may cause the first chimney locking protrusions 129a to engage with the first locking interface or interfaces 205 of the adapter 202. Thus, the relative rotation of the first chimney portion 100 and the second chimney portion 300 with the adapter 202 placed therewithin allows the first chimney 100 to properly connect to the second chimney portion 300. Once the first chimney portion 100 and the second chimney portion 300 are connected via the aforementioned twist-and-lock procedure, the clamping ring 203 may be placed around the outer rim 131 of the first chimney portion and the outer rim 331 of the second chimney. The clamping rim 203 may be subsequently tightened thus locking and preventing rotation between the first chimney portion 100 and the second chimney portion 300.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. An adapter configured to connect a female end of a first chimney portion to a male end of a second chimney portion, the adapter comprising:
    a first radial adapter portion with a first inner surface and a first outer surface extending along a first axis, wherein the first inner surface and the first outer surface are substantially coaxial;
    a first locking interface protruding outward from the first outer surface and configured to engage with a first locking interface of the first chimney portion;
    a second locking interface protruding inward from the first inner surface and configured to engage with a second interlocking interface of the second chimney portion, wherein the first outer surface is configured to be received within the female end of the first chimney portion and the first inner surface is configured to receive the male end of the second chimney portion,
    wherein the first locking interface of the adapter is configured to engage with a first locking interface of the first chimney portion when the adapter is oriented in a position within the female end of the first chimney portion and one of the first chimney portion and the adapter is rotated with respect to the other of the first chimney portion and the adapter.

2. The adapter of claim 1, wherein the second locking interface of the adapter is configured to engage with a second locking interface of the second chimney portion when male end of the second chimney portion is oriented to a position within the adapter and one of the second chimney portion and the adapter is rotated with respect to the other of the second chimney portion and the adapter.

3. The adapter of claim 1, wherein the second locking interface of the adapter is formed as a partially curved protrusion.

4. The adapter of claim 1, wherein the second locking interface of the adapter is formed as an angled protrusion.

5. The adapter of claim 1, wherein the first locking interface of the adapter is formed as a curved protrusion.

6. The adapter of claim 1, wherein the first locking interface of the adapter is formed as an angled protrusion.

7. The adapter of claim 1, further comprising a second radial adapter surface that is connected to the first radial adapter portion and is substantially perpendicular to the first inner surface and the first outer surface of the first radial adapter portion.

8. An adapter system configured to connect a female end of a first chimney portion to a male end of a second chimney portion, the adapter system comprising:
  an adapter, wherein the adapter comprises:
    a first radial adapter portion with a first inner surface and a first outer surface extending along a first axis and, wherein the first inner surface and the first outer surface are substantially coaxial;
    a first locking interface protruding outward from the first outer surface and configured to engage with a first locking interface of the first chimney portion;
    a second locking interface protruding inward from the first inner surface and configured to engage with a second interlocking interface of the second chimney portion,
  wherein the first outer surface is configured to be received within the female end of the first chimney portion and the first inner surface is configured to receive the male end of the second chimney portion, wherein the adapter system further comprises:
  an inner sleeve configured to fit within the adapter, the first chimney portion, and the second chimney portion; and
  a clamping ring configured to interface with and hold together a first chimney portion flange of the first chimney and a second chimney portion flange of the second chimney portion.

9. The adapter system of claim 8, wherein the first locking interface is configured to engage with a first locking interface of the first chimney portion when the adapter is oriented in a position within the female end of the first chimney portion and one of the first chimney portion and the adapter is rotated with respect to the other of the first chimney portion and the adapter.

10. The adapter system of claim 8, wherein the second locking interface of the adapter is configured to engage with a second locking interface of the second chimney portion when male end of the second chimney portion is oriented to a position within the adapter and one of the second chimney portion and the adapter is rotated with respect to the other of the second chimney portion and the adapter.

11. The adapter system of claim 8, wherein the second locking interface of the adapter is formed as a partially curved protrusion.

12. The adapter system of claim 8, wherein the second locking interface of the adapter is formed as an angled protrusion.

13. The adapter system of claim 8, wherein the first locking interface of the adapter is formed as a curved protrusion.

14. The adapter system of claim 8, wherein the first locking interface of the adapter is formed as an angled protrusion.

15. The adapter system of claim 8, further comprising a second radial adapter surface that is connected to the first radial adapter portion and is substantially perpendicular to the first inner surface and the first outer surface of the first radial adapter portion.

16. An adapter configured to connect a female end of a first chimney portion to a male end of a second chimney portion, the adapter comprising:
  a first adapter portion with a first annular inner surface and a first annular outer surface extending along a first axis;
  a first locking interface protruding outward from the first annular outer surface and configured to engage with a first locking interface of the first chimney portion;
  a second locking interface protruding inward from the first annular inner surface and configured to engage with a second interlocking interface of the second chimney portion, wherein the first annular outer surface is configured to be received within the female end of the first chimney portion and the first annular inner surface is configured to receive the male end of the second chimney portion,
  wherein the second locking interface of the adapter is configured to engage with a second locking interface of the second chimney portion when male end of the second chimney portion is oriented to a position within the adapter and one of the second chimney portion and the adapter is rotated with respect to the other of the second chimney portion and the adapter.

17. The adapter of claim 16, wherein the first locking interface of the adapter is configured to engage with a first locking interface of the first chimney portion when the adapter is oriented in a position within the female end of the first chimney portion and one of the first chimney portion and the adapter is rotated with respect to the other of the first chimney portion and the adapter.

* * * * *